(No Model.) 4 Sheets—Sheet 2.
R. WHITE.
DRYING APPARATUS.
No. 472,323. Patented Apr. 5, 1892.
Fig: 2.
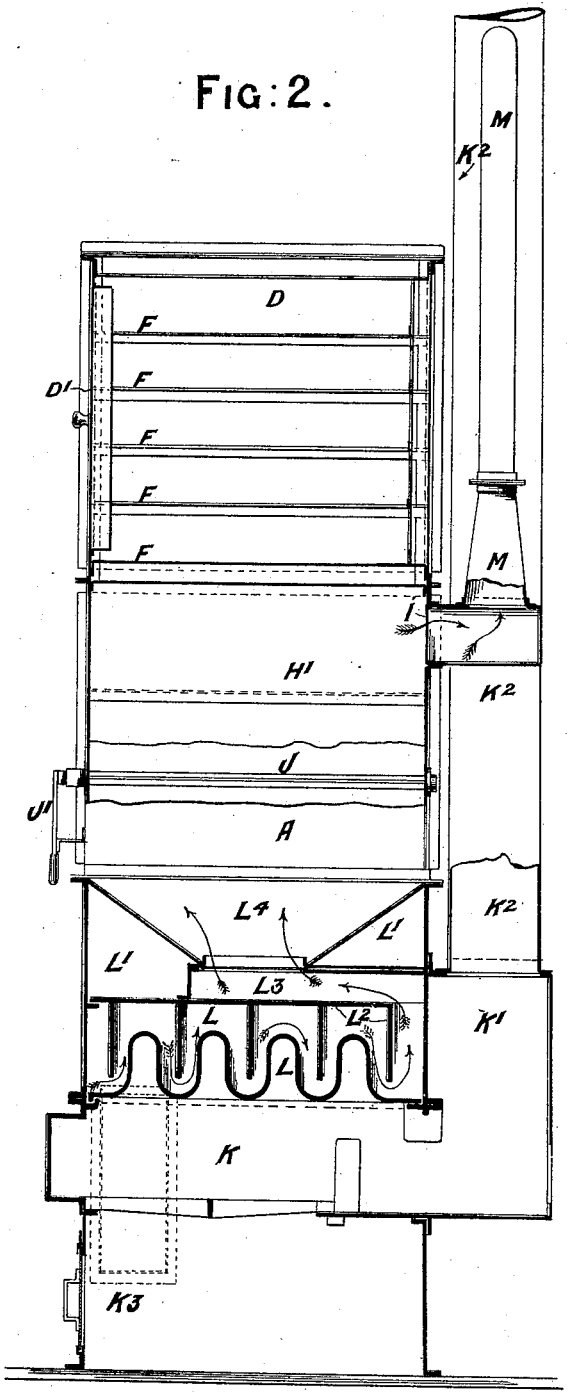
Witnesses
Chas. H. Smith
J. Staib
Inventor
Richard White
per Lemuel W. Serrell
Atty (No Model.) 4 Sheets—Sheet 3.
R. WHITE.
DRYING APPARATUS.
No. 472,323. Patented Apr. 5, 1892.
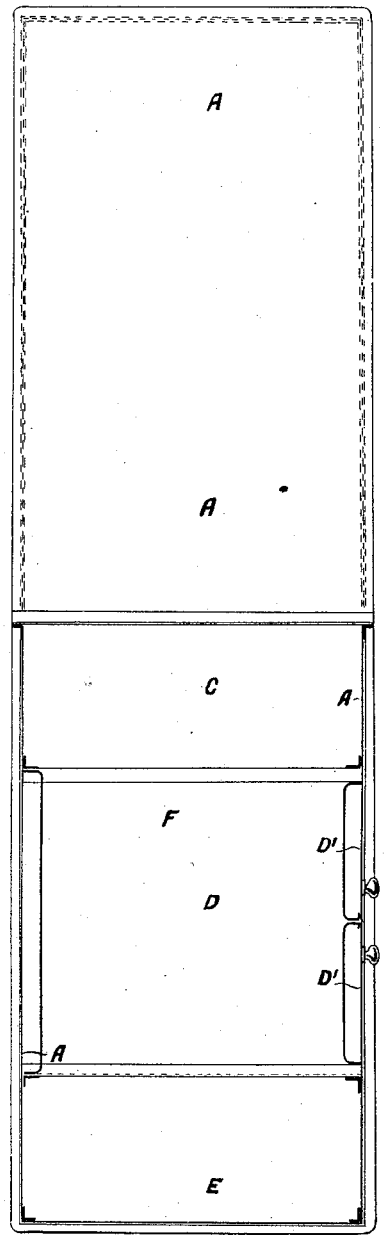
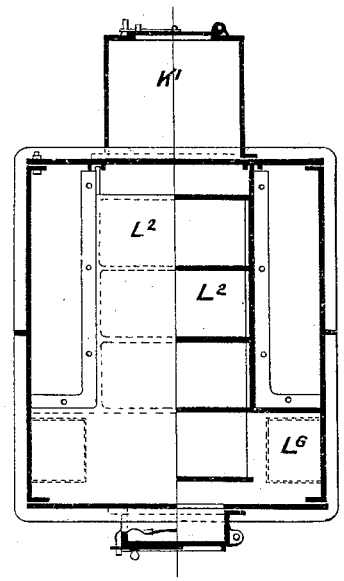
Witnesses
Chas H. Smith
J. Staib
Inventor
Richard White
per Lemuel W. Serrell
atty (No Model.)  4 Sheets—Sheet 4.
R. WHITE.
DRYING APPARATUS.
No. 472,323. Patented Apr. 5, 1892.
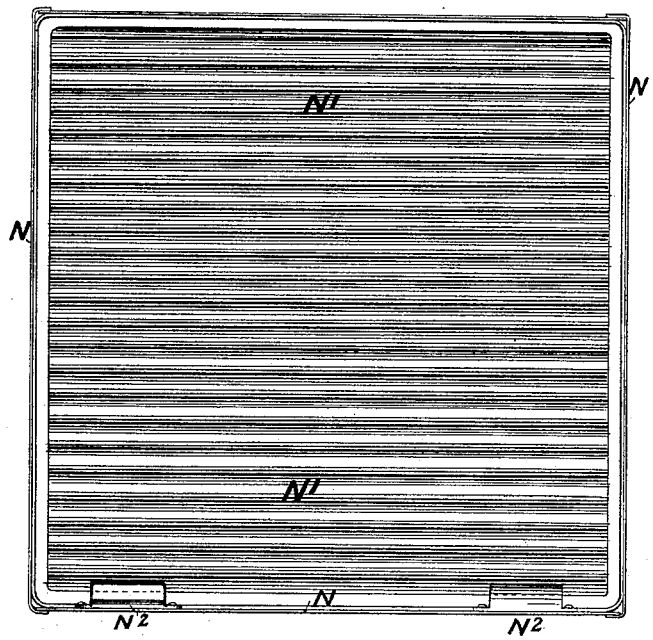
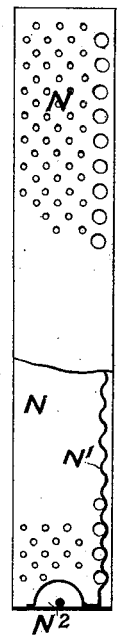
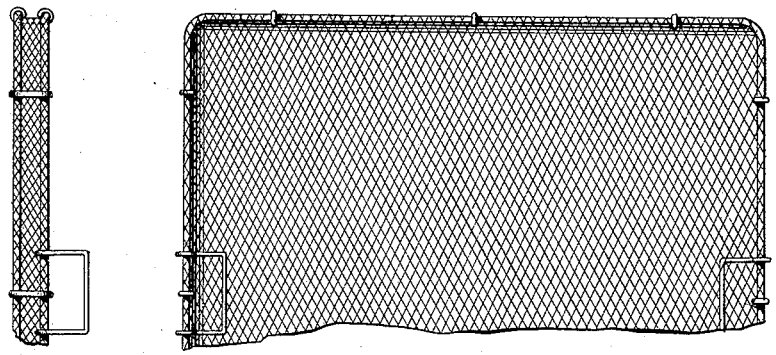

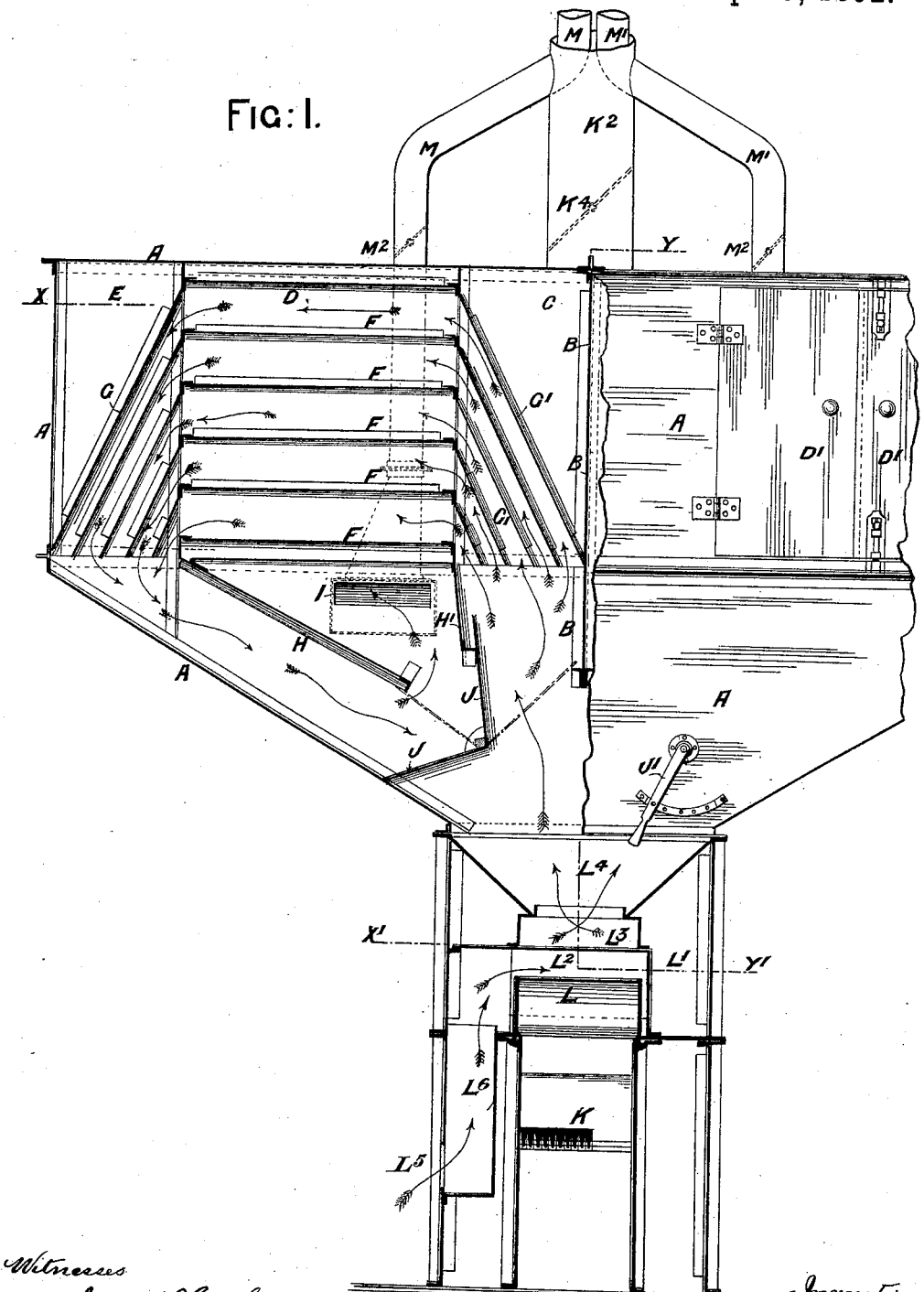

UNITED STATES PATENT OFFICE.

RICHARD WHITE, OF LONDON, ENGLAND.

DRYING APPARATUS.

SPECIFICATION forming part of Letters Patent No. 472,323, dated April 5, 1892.

Application filed August 29, 1891. Serial No. 404,041. (No model.) Patented in England November 10, 1890, No. 18,038.

*To all whom it may concern:*

Be it known that I, RICHARD WHITE, a subject of the Queen of Great Britain, residing at London, England, have invented certain new and useful Drying Apparatus, (for which a patent has been granted to me in Great Britain, dated November 10, 1890, No. 18,038,) of which the following is a specification.

The object of my improvements is to provide an apparatus that will more effectually and rapidly than heretofore dry cacao, coffee, tea, cinchona, and other barks, hops, corn, seeds, fruit, and other produce, as well as articles used in the arts and manufactures and the products thereof, by means of a current of hot air or of cold desiccated air passing under, through, and over the substance to be dried, and which latter is placed on trays or shallow boxes on shelves in a drying-chamber without the same air after taking up the moisture from the substance drying, again passing under, through, or over any of the trays. The current of dry air may be easily reversed and made to pass through the apparatus in the opposite direction by a slight movement of valves provided for that purpose, and all as hereinafter fully described.

The accompanying drawings illustrate the apparatus constructed according to my invention, and by reference thereto and to the following description the invention will be understood.

Figure 1 is a front elevation of the apparatus, the left-hand and lower portion being in section in order to show the interior arrangement. Fig. 2 is a transverse sectional elevation of same. Fig. 3 is a horizontal projection of the apparatus, the left-hand half being in section on the line X Y of Fig. 1. Fig. 4 is a horizontal section on the line X' Y' of Fig. 1. Fig. 5 is a sectional plan of one of the trays drawn to a larger scale than the previous figures. Fig. 6 is a sectional side elevation, and Fig. 7 a sectional front elevation, of the tray shown at Fig. 5. Fig. 8 is a partial plan, and Fig. 9 a partial side elevation, showing one of the inner wire-gauze trays.

Similar letters of reference refer to like parts in all the figures.

A is the outside casing of the apparatus, of rectangular form tapering to the base, below which the heating apparatus is conveniently placed. The outer casing A is made of sheet metal and is formed in, say, four sections, as shown, held together by angle-iron joints and having a central vertical division B in the interior extending from the top to near the base of the casing A. The space on each side of the division B is similarly fitted and each half is as follows, or only one such half need be employed.

C, D, and E are three subdivisions, the middle D being, say, twice the width of the chambers C or E.

D' D' are doors in the front of the casing for gaining admittance to the divisions D D.

F are shelves in the division D for carrying the sliding trays, hereinafter described, for containing the substance to be dried. These shelves form subdivisions of the chamber D, extending from the front to the back of the casing.

G G' are inclined divisions in the subdivisions C and E, corresponding with and forming passages or ducts to the shelves F.

H is an inclined division-plate parallel with the sloping base of the casing A for directing the heated air to or from the passages between the divisions G.

H' is another division-plate for directing the heated air to or from the passages between the divisions G'.

I is an aperture in the casing A, situate between the two plates H and H' for the escape of the air from the apparatus after the same has been utilized.

J is a double or V-shaped valve for changing the directions of the currents of air, and which is operated from the outside by handle J'. There are two valves J and two operating-handles J', said valves J being located at each side of the central division and at the junction of the respective passages leading to and from the trays.

K is the furnace with smoke-box K' and chimney K².

K³ is the ash-pit door.

The upper part or crown of the furnace is composed of a corrugated metal plate L, with chamber L' above same. L² is a plate extending partially across this chamber L' and formed with depending louvers or baffles entering partially the corrugations of the plate L.

L³ is a passage leading from the corrugated chamber above the furnace by the hopper L⁴ to the base of the casing A.

L⁵, Fig. 1, is an entrance for the air to be heated, which passes to the corrugated chamber by passage L⁶.

M M' are tubes leading from the exit-apertures I, extending to and entering the chimney K², the said tubes M M' being provided at top (not shown in the drawings) with conical down draft-preventers, and M² are valves in the tubes for regulating the draft; but other arrangements for the chimney may of course be adopted.

K⁴ is a damper in the chimney K². These dampers and valves should be worked from the front of the machine.

The trays shown from Figs. 5 to 7 are made with perforated sides N, and which might be provided with shutters for closing the perforations, when necessary, and with a base of corrugated metal N', having an angle-iron frame-work.

N² N² are handles for moving the trays. The apertures in the sides of the tray immediately above the corrugations, such as are shown at Fig. 6, should be larger than and coincide with the corrugations in order to admit the air freely to the bottom of the corrugations in the base of the tray.

Figs. 8 and 9 show inner wire-gauze trays for being placed in the trays and which contain the substance to be dried. Three of these inner wire trays or sieves will fit one above the other into a tray N. (Shown at Figs. 5 to 7.) These trays or sieves are particularly useful where the substance to be dried would without their use lie in the corrugations of the bottom N', and thereby impede the free circulation of the air along the corrugations.

The action of the apparatus is as follows: The furnace being started, air enters through various apertures L⁵, passing by passages L⁶ to and between the plates L and L², where it becomes heated, and passes by passages L³ and L⁴ into the base of the casing A. Supposing the valves J to be both in the position indicated by the left-hand valve, then the passage of the heated air would be similar on both sides of the partition B and as indicated by the arrows in Fig. 1—viz., up through the passages formed by the partitions G' and through the perforations in the sides N of the trays, which would have been, with their contents, previously placed in position on the various shelves F, and the doors D' closed and secured, and out through the passages formed by the partitions G and between the partition H and the casing A, finding its exit by the aperture I at the back on each side of the partition B, and passing by the pipes M M' into the flue or chimney K². By the above arrangement the heated air passes to each of the trays separately without there being any communication from one tray to the other, so that the steam or vapor carried off from the contents of one tray cannot communicate with the contents of another or adjacent tray. By changing the position of the valve J to that shown by dotted lines the direction of the current of air is immediately reversed, which is of advantage in drying some materials—such as cacao-beans—which ought not to be handled, but at the same time require drying on all sides, and this is accomplished by first placing the valve in one position, then in the other, and subsequently turning the inner and secondary trays round as may be required.

When cool desiccated air is used, the apparatur must be fitted with an exhaust fan or blower.

I claim—

1. In drying apparatus, the combination, with an air-heating apparatus, of a centrally-divided casing A, each half being subdivided into separate passages leading to separated trays and separated passages leading from the trays, together with directing-valves J at the junctions of the respective passages leading to and from the trays at each side of the central division, the exits I below the trays, and the pipes M, leading therefrom to a chimney, whereby the heated air passes to and from each of the drying-trays separately, as set forth.

2. In a drying apparatus, the combination, with the casing having passage-ways for directing the heated air, of removable trays having corrugated bottoms, perforated metal sides, and secondary trays of wire-gauze for receiving the articles to be dried and fitting within the removable trays, substantially as specified.

3. The combination, with the air-heating furnace, of a case above the same having shelves and removable trays, chambers at the ends of the shelves, and inclined divisions extending downwardly from the ends of the shelves, an inclined division-plate below the bottom shelf, and an escape-flue above such division-plate and below the lower shelf, and a damper pivoted at the junction of the passages, so as to open and close the respective passages and change the direction of the circulating hot air on the material to be dried, substantially as specified.

RICHARD WHITE.

Witnesses:
W. J. NORWOOD,
JOHN DEAN,
*Both of No. 17 Gracechurch Street, London, E. C.*